May 16, 1967 C. F. LEATHERS 3,320,400

PORTABLE WELDER WITH AUTOTRANSFORMER

Filed Aug. 1, 1966

INVENTOR
CHESTER F. LEATHERS
BY
Woodhams, Blanchard & Flynn
ATTORNEYS

United States Patent Office 3,320,400
Patented May 16, 1967

3,320,400
PORTABLE WELDER WITH AUTOTRANSFORMER
Chester F. Leathers, Kalamazoo, Mich., assignor to Cal Manufacturing Company, Kalamazoo, Mich., a partnership
Filed Aug. 1, 1966, Ser. No. 569,457
10 Claims. (Cl. 219—89)

This invention relates in general to a portable electric welding apparatus and, more particularly, to a type thereof having an autotransformer separably supported thereon.

Persons familiar with the use and operation of portable electric welding devices, such as the welding guns commonly used in the assembly of automobile bodies, have long been aware of the need for improvement in these welding devices. Existing electric welders of this type are often constructed to serve a specific welding need. That is, the jaws that support the welding electrodes are designed and constructed so that they will fit around or through or into a certain part of the structure, such as an automobile body, being welded thereby. Thus, the welding jaws are often changed or replaced with each change in the body style and it is obviously desirable to minimize the cost resulting from this change.

It is well known that electric welding is preferably accomplished with a combination of relatively low voltage and high amperage. However, the wattage is sufficiently high that large amounts of heat are generated during normal operation and as a result, the welding jaws and electrical conductors connected thereto are cooled, usually by circulated water.

Because of the high amperage requirements, large electrical conductors are required between the welding jaws and the main transformer which provides the low voltage current. Many attempts have been made for many years to design water cooled, low resistance conductors with a maximum flexibility and minimum weight. However, where voltage must be reduced from 440 volts to five volts, for example, there are certain inherent limitations on the amount of flexibility and weight reduction that can be achieved.

In further pursuit of an answer to this problem, attempts have been made to minimize the cross-sectional area, hence the size and weight, of the electrical conductors between the main transformer and the welding jaws while maintaining the same amount of cooling, by increasing the voltage applied to the supply cable and then further reducing it at the welding gun. Alternatively, the doubling of the voltage and maintaining the same wattage delivered to the welding apparatus can be accomplished with a 75 percent reduction in heat, through conductors of the same size. Accordingly, by reducing the size of the conductors until the original heat levels were attained, a smaller, lighter weight and more flexible conductor could be used for the same service.

It has been recognized, these objectives can be accomplished by mounting a transformer on the welding jaws. However, prior attempts to create such a transformer structure on or in association with the portable welding device have resulted in transformer units which are either built integrally into the welding gun or which are connectible thereto, but in either case same have been too heavy or too inflexible in use to present a practical solution to the foregoing described difficulties. Therefore, although it has been previously recognized that the use of such a second transformer would have the advantages above outlined, no practical design to accomplish same has to my knowledge yet been created.

Accordingly, the objects and purposes of this invention have been:

(1) To provide a portable welding apparatus which is capable of developing voltage and amperage across its welding electrodes substantially identical to those developed by previously existing welding devices without substantially increasing the weight of the welding device, but while decreasing substantially the size, weight rigidity and cost of the cable connecting the welding device to the primary source of energy.

(2) To provide apparatus as aforesaid which includes an autotransformer separably attached to the welding jaws and arranged for connection to the welding cable at substantially the same point and by substantially the same means as that provided for connecting the autotransformer to the welding jaws.

(3) To provide apparatus as aforesaid wherein the autotransformer is relatively light in weight, capable of continuous operation under a relatively heavy load by comparison to such weight and which can be mounted upon the welding gun so that it does not interfere in any way with the normal operation thereof.

Other objects and purposes of this invention will be apparent to persons familiar with portable welding devices upon reading the following specification and examining the accompanying drawings, in which.

General description

The objects and purposes of the invention, including those set forth above, have been met by recognizing that the usual welding gun has a pair of terminals which are normally fixedly spaced from each other, but which may be movable with respect to each other. The usual welding cable is provided with a pair of terminals rigidly related to each other, but insulated from each other, which cable terminals are insertable between said welding gun terminals. The autotransformer of the invention is provided with three terminals of which a first and second thereof are positioned close to but insulated from each other.

The first autotransformer terminal is connected to one input to the primary circuit thereof and also to one output of the autotransformer. The second autotransformer terminal is connected to the other output of the autotransformer. A third termianl on the autotransformer is connected to the other input to the primary circuit thereof. The third terminal is spaced sufficiently from the first terminal so that the welding cable terminals may be inserted between said third terminal and the terminal of the welding gun which is in contact with said first terminal. Thus, one terminal of said welding cable has an electrical connection through a terminal of the welding gun to said first terminal of said autotransformer and the other welding cable terminal is electrically connected with said third autotransformer terminal. The terminals of the autotransformer, the cable and the welding device are placed in alignment with each other for connection as aforesaid by a single pivot pin passed therethrough and made of insulating material or insulated therefrom whereby all mechanical strain between the welding gun and the cable is carried by said pin and not through the structure of the autotransformer.

*Detailed description*

Figure 1:
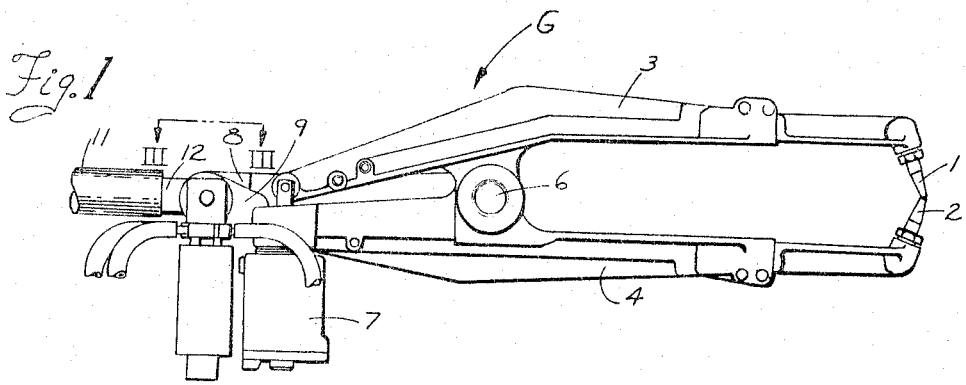
FIGURE 1 is a side view of a welding gun in association with a standard welding cable and an autotransformer.

Referring now to the drawings in detail, there is shown in FIGURE 1 a side view of a welding gun with a standard cable and an autotransformer connected thereto. The welding electrodes 1 and 2 are mounted in a conventional manner on arms 3 and 4 which are pivoted together at 6 and are provided with conventional means 7, such as a piston and cylinder arrangement, for mechanically moving said welding electrodes toward and away from each other as desired. A pair of terminals, here supply lugs 8 and 9, project from the frame of the portable welding device and are electrically connected in any convenient manner with the welding electrodes 1 and 2.

A welding cable 11 of conventional type, such as those shown in my U. S. Patents 2,943,133 and 3,163,704, is provided with a pair of output terminals, here output lugs 12 and 13, which are rigidly connected with respect to each other in side-by-side relation, but which are insulated from each other for the usual purposes. Said output lugs are normally insertable between the supply lugs 8 and 9 of the welding device for supplying electrical potential thereto. That is, the space between the opposing surfaces of the supply lugs 8 and 9 is substantially the same as the combined thickness of the output lugs 12 and 13 so that said lugs 12 and 13 can fit snugly between the lugs 8 and 9 and have a good electrical contact therewith.

Figure 2:
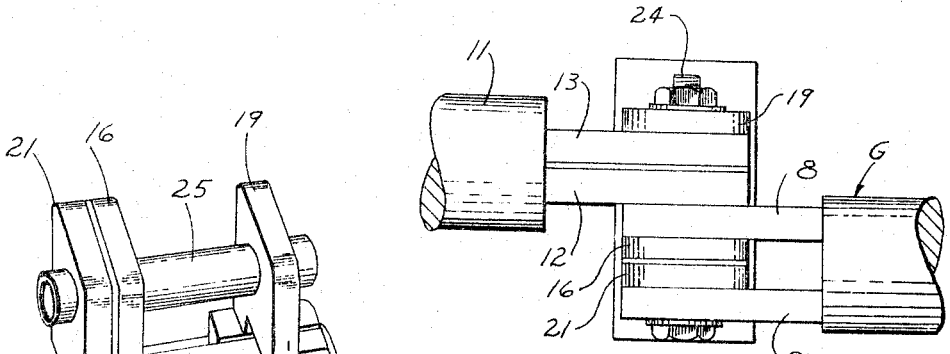
FIGURE 2 is a perspective view of the autotransformer used in the present invention and showing in broken lines a diagrammatic view of the essential circuitry of the autotransformer.
Figure 3:
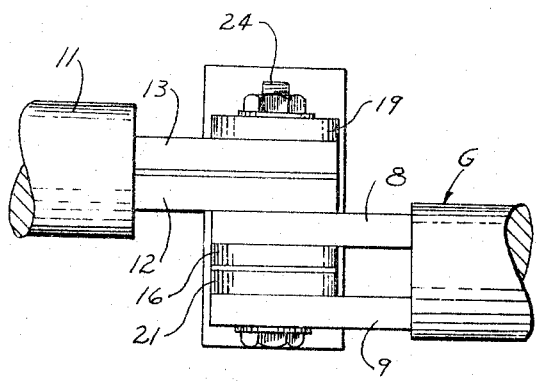
FIGURE 3 is a top plan view showing the connection of the autotransformer to the welding cable and to the welding device, such as a welding gun.

Turning now to FIGURE 2, there is shown a perspective view of one transformer embodying the invention, which in this instance is an autotransformer. The internal structural arrangement of the autotransformer may be of any suitable conventional design having a low impedance and adequate provision for water cooling. The same may embody any of many well known designs and hence, are not shown here other than schematically. The primary circuit is indicated as extending from a first terminal 16 through a primary winding 17 comprised of parts 17a and 17b and then extending to and connecting with a third terminal 19. The secondary circuit extends from a second terminal 21 through part 17a of said transformer winding and then to the terminal 19. The windings will normally be supplied with an iron core in the conventional manner of transformer design.

The terminals 16, 19 and 21 are preferably aligned with each other and are arranged with terminals 16 and 21 in close association but insulated from each other. In the embodiment here shown the combined thickness of the terminals 16 and 21 is substantially equal to the combined thickness of the cable lugs 12 and 13. Thus, the autotransformer terminals 16 and 21 can fit snugly between the lugs 8 and 9 and have a good electrical contact therewith. The terminal 19 is spaced from the terminal 16 a distance sufficient to permit the snug insertion therebetween of the lug 8 of the welding gun together with the two lugs 12 and 13 of the supply cable 11. Thus, the output terminal 13 of the cable 11 contacts the input terminal 19 of the primary transformer circuit and the other output terminal 12 of said cable is electrically connected through the lug 8 of the welding gun with the other input terminal 16 of said primary winding whereby the voltage supplied from said cable is imposed across the primary circuit of said transformer. At the same time the terminals 16 and 21 connected to the secondary circuit of said transformer are connected to the input lugs 8 and 9 of the welding device. Thus, the output voltage from the cable is applied across the primary circuit of the transformer and the output voltage of the transformer is applied to the input circuit of the welding gun.

A pin 24 and an insulating sleeve 25 therefor extend through all of said lugs to fasten same together in the relationship above described, but permits the usual desired relative pivotal movement between the welding gun and the supply cable connected thereto. This provides for direct transmission of mechanical forces between the cable and the gun in the same manner as in the usual connection between the cable and the gun. None of such mechanical forces in this embodiment are required to be transmitted through the structure of the autotransformer itself.

With reference to the type of welding gun, not shown in the drawings, which has a single fixed input lug and has other input contact applied to a flexible conductor, the same transformer as above described is applicable thereto, the same being so connected that the fixed lug of the welding gun corresponds to the lug 8 above described and the movable contact corresponds to the lug 9 above described.

Although a particular embodiment of the invention has been described above in detail for illustrative purposes, it will be recognized that variations or modifications of such disclosure, which lie within the scope of the appended claims, are fully contemplated. It is particularly contemplated that while the foregoing described embodiment having three aligned lugs is preferred, the broader aspects of the invention may be met by providing a first pair of terminals on the transformer for connecting with the output lugs of the supply cable and a second pair of lugs, nonaligned with said first pair, for connecting with the supply lugs of the welding gun. One terminal of each of said pairs of terminals will be interconnected where said transformer is an autotransformer, but will be independent of each other where said transformer is a transformer having two independent windings.

The embodiments of the invention in which an exclusive property or privilege is claimed are defined as follows:

1. In an electric welding device having a pair of relatively movable electrodes, the combination comprising:
    support means movably relating said electrodes with respect to each other;
    autotransformer means separable from said support means and said electrodes and connected in circuit with said electrodes for reducing the voltage across said electrodes and means releasably attaching said autotransformer means to said support means so that said autotrransformer means can be easily separated as a unit from said welding device without requiring disassembly of said support means; and
    flexible conductor means releasably and electrically connected to said autotransformer means at said support means and said flexible conductor means being at least partially supported by said support means.
2. An electric welding device according to claim 1, wherein said support means includes a pair of input terminals and includes also a pair of pivotally connected arms and said arms include electrical conductors connecting said terminals to said electrodes and said support means further includes pin means extendable through said input terminals;
    wherein said autotransformer means has three terminals extending from one end thereof, said autotransformer terminals having coaxial openings therethrough through which said pin means is slideably and rotatably received, whereby said autotransformer is relatively pivotable with respect to at least one of said arms, two of the autotransformer terminals being electrically connectible with the two input terminals, respectively, when sleeved upon said pin means and the third terminal being substantially spaced from the other two terminals;
    and a pair of electrically insulated lugs at the end of said flexible conductor means, said lugs being mounted on said pin means, said lugs having coaxial openings therethrough through which said pin means is slideably receivable when said lugs are disposed between said third autotransformer terminal and one of the other two autotransformer terminals, said lugs being electrically and respectively engaged with said third autotransformer terminal and said one of the other two autotransformer terminals.

3. An electric welding device according to claim 1, wherein said support means comprises a pair of pivotally connected arms and a pair of lugs projecting therefrom at a point substantially adjacent the point of such pivotal connection, said autotransformer means having terminals releasably connected to said lugs and said flexible conductor means being releasably connected to both said lugs and said terminals of said autotransformer means.

4. An electric welding device according to claim 1, wherein said flexible conductor means has a pair of contacts and said support means has a pair of lugs adapted for normal connection to said flexible conductor contacts, wherein said autotransformer means has three lugs projecting therefrom of which the first and second are connectible to said lugs of said support means and the third thereof is arranged with respect to the first autotransformer lug for reception of and respective contact with the two contacts of said flexible conductor means, the first autotransformer lug being connectible to one end of the winding of said autotransformer means, the second autotransformer lug being connectible to an intermediate tap of the autotransformer winding, and the third autotransformer lug being connectible to the other end of the autotransformer winding.

5. A welding device including a portable welding unit having a pair of input terminals and a cable supply therefor, said cable having a pair of supply terminals at one end thereof, comprising in combination:
a transformer unit having primary and secondary circuits therein;
first, second, and third terminals projecting from said transformer unit, said first and second transformer terminals being connected electrically to the ends of the secondary circuit and the first transformer terminal also being connected to one end of the primary circuit, said first and second transformer terminals being closely adjacent each other but electrically insulated from each other and being receivable between the input terminals of said welding device, said third transformer terminal being connected to the other end of said primary circuit and spaced sufficiently from said first transformer terminal to receive therebetween both of the supply terminals of said cable and also one input terminal of the welding device in such relation to each other that in operating condition one supply terminal of said cable will be in close electrical contact with said third transformer terminal and the other supply terminal of said cable will be in close electrical contact with said one input terminal and said one input terminal will simultaneously be in close electrical contact with said first transformer terminal; and
a single pin extending through all of said terminals for holding same in the aforesaid relationship to each other.

6. A welding device according to claim 5, in which the space between said input terminals is substantially equal to the combined thickness of said pair of supply terminals so that the supply terminals can be snugly received therebetween and the combined thickness of the first and second transformer terminals is equal to the space between the input terminals.

7. A welding gun having a pair of spaced supply lugs; flexible supply conductor means having output lugs;
a transformer independent of and separably mounted to said welding gun, said transformer having a secondary circuit with terminals detachably connectible to said supply lugs and a primary circuit with terminals detachably connectible to said output lugs whereby said transformer can be removed from said welding gun without requiring disassembly of same.

8. The device of claim 7, in which said transformer is an autotransformer and in which said output lugs are spaced so as to be adapted to interfit with said supply lugs, said supply lugs interfitting with the secondary circuit terminals of said autotransformer and said output lugs interfitting with the primary circuit terminals of said autotransformer.

9. The device of claim 7, in which said output lugs are spaced so as to be adapted to interfit with said supply lugs, in which said primary circuit terminates in first and second terminals spaced to interfit with said output lugs and in which said secondary circuit terminates in said second terminal and a third terminal, said second and third terminals being spaced to interfit with said supply lugs.

10. The device of claim 9, in which said first, second and third terminals are arranged in a straight line and said terminals and lugs are connectible to each other by a single pin whereby mechanical forces between said supply conductor means and said gun are transmitted directly through said pin and not through the body of said transformer.

References Cited by the Examiner
UNITED STATES PATENTS 1,645,705 10/1927 Ledwinka _____ 219—89
2,236,162 3/1941 Von Henke _____ 219—90

RICHARD M. WOOD, *Primary Examiner.*